United States Patent [19]

Lee

[11] Patent Number: 5,668,600

[45] Date of Patent: Sep. 16, 1997

[54] METHOD AND APPARATUS FOR ENCODING AND DECODING A VIDEO SIGNAL USING FEATURE POINT BASED MOTION ESTIMATION

[75] Inventor: Min-Sup Lee, Seoul, Rep. of Korea

[73] Assignee: Daewoo Electronics, Co., Ltd., Seoul, Rep. of Korea

[21] Appl. No.: 740,358

[22] Filed: Oct. 28, 1996

[30] Foreign Application Priority Data

Oct. 28, 1995 [KR] Rep. of Korea ............... 95-37865

[51] Int. Cl.$^6$ ..................................... H04N 7/32
[52] U.S. Cl. ........................... 348/416; 348/699
[58] Field of Search ................... 348/416, 699, 348/700, 402, 415, 409, 401, 400, 390, 384; 382/236, 238, 241, 243

[56] References Cited

U.S. PATENT DOCUMENTS

| | | | |
|---|---|---|---|
| 5,241,608 | 8/1993 | FOgel | 348/699 |
| 5,546,129 | 8/1996 | Lee | 348/416 |
| 5,579,401 | 11/1996 | Gear | 348/699 |
| 5,581,308 | 12/1996 | Lee | 348/699 |
| 5,592,228 | 1/1997 | Dachiku et al. | 348/416 |
| 5,598,216 | 1/1997 | Lee | 348/416 |

*Primary Examiner*—Howard W. Britton
*Assistant Examiner*—Luanne P. Din
*Attorney, Agent, or Firm*—Anderson Kill & Olick P.C.

[57] ABSTRACT

An apparatus, for use in an image signal encoding system, encodes a bidirectionally predictive frame (B frame) of a digital video signal to generate an encoded B frame signal. The apparatus selects two groups of pixels from pixels contained in a detected processing regions of a first and a second reference frames as a first and a second sets of feature points, respectively, by using a feature points selection circuit; and then determines a first set of motion vectors between the current and the first reference frames and a second set of motion vectors between the current and the second reference frames through the use of a feature point motion estimation circuit. Thereafter, the apparatus selects a set of motion vectors for the set of feature points from the first and the second sets of motion vectors to thereby generate a selected set of motion vectors and selection information representing the selected set as the encoded B frame.

24 Claims, 9 Drawing Sheets

METHOD AND APPARATUS FOR ENCODING AND DECODING A VIDEO SIGNAL USING FEATURE POINT BASED MOTION ESTIMATION

FIELD OF THE INVENTION

The present invention relates to a method and apparatus for encoding a video signal; and, more particularly, to a method and apparatus for encoding and decoding a digital video signal using an improved feature point based motion estimation, thereby effectively reducing the transmission rate of the digital video signal with a good picture quality.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amount of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM (differential pulse coded modulation), two-dimensional DCT (discrete cosine transform), quantization of DCT coefficients, and VLC (variable length coding). The motion compensated DPCM is a process estimating the movement of an object between a current frame and a previous frame or future frame, i.e., a reference frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications, COM*-33, No. 12 (December 1985); and in Ninomiya and Ohtsuka, "A Motion-Compensated Interframe Coding Scheme for Television Pictures", *IEEE Transactions on Communications, COM*-30, No. 1 (January 1982).

The two-dimensional DCT, which reduces or makes use of spatial redundancies between image data, converts a block of digital image data, for example, a block of 8×8 pixels, into a set of transform coefficient data. This technique is described in Chen and Pratt, "Scene Adaptive Coder", *IEEE Transactions on Communications, COM*-32, No. 3 (March 1984). By processing such transform coefficient data with a quantizer, zigzag scanning, and VLC, the amount of data to be transmitted can be effectively compressed.

Specifically, in the motion compensated DPCM, current frame data is predicted from corresponding reference frame data based on an estimation of the motion between the current and a reference frames. Such estimated motion may be described in terms of two dimensional motion vectors representing a displacement of pixels between the reference and the current frames.

There have been two basic approaches to estimate the displacement of pixels of an object: one is a block-by-block estimation and the other is a pixel-by-pixel approach.

In the block-by-block motion estimation, a block in a current frame is compared with blocks in its reference frame until a best match is determined. From this, an interframe displacement vector, indicating how much the block of pixels has moved between frames, for the whole block can be estimated for the current frame which is being transmitted.

Such block matching technique may be employed in predicting P and B frames included in video sequences, as disclosed in *ITU Telecommunication Standardization Sector Study Group* 15, *Working Party* 15/1 *Expert's Group on Very Low Bit Rate Visual Telephony*, "Video Codec Test Model, TMN4 Rev1", (Oct. 25, 1994), wherein a P denotes a predictive frame which is predicted from its previous frame (as the reference frame) while a B means a bidirectionally predictive frame predicted from its previous and future frames (as the reference frame). In coding the so-called B frame, in particular, a bidirectional motion estimation technique is employed in order to derive forward and backward displacement vectors, wherein the forward displacement vector is obtained by estimating the movement of an object between a B frame and its previous intra(I) or predictive(P) frame as the reference frame and the backward displacement vector is derived based on its future I or P frame as the reference frame.

However, in the block-by-block motion estimation, blocking effects at the boundary of a block may occur in a motion compensation process; and poor estimates may result if all pixels in the block do not move in a same way, to thereby decrease the overall picture quality.

Using a pixel-by-pixel approach, on the other hand, a displacement is determined for each and every pixel. This technique allows a more exact estimation of the pixel value and has the ability to easily handle scale changes, e.g., zooming, movement perpendicular to the image plane. However, in the pixel-by-pixel approach, since a motion vector is determined at each and every pixel, it is virtually impossible to transmit all of the motion vectors to a receiver.

One of the techniques introduced to ameliorate the problem of dealing with the surplus or superfluous transmission data resulting from the pixel-by-pixel approach is a feature point based motion estimation method.

In the feature point based motion estimation technique, motion vectors for a set of selected pixels, i.e., feature points, are transmitted to a receiver, wherein each of the feature points is defined as a pixel capable of representing its neighboring pixels so that motion vectors for non-feature points can be recovered or approximated from those of the feature points in the receiver. In an encoder which adopts the motion estimation based on feature points, disclosed in a copending commonly owned application, U.S. Ser. No. 08/435,688, entitled "Method and Apparatus for Encoding a Video Signal Using Feature Point Based Motion Estimation", a number of feature points are first selected from all of the pixels contained in the previous frame. Then, motion vectors for the selected feature points are determined, wherein each of the motion vectors representing a spatial displacement between one feature point in the previous frame and a corresponding matching point, i.e., a most similar pixel, in the current frame. Specifically, the matching point for each of the feature points is searched in a search region within the current frame by using a known block matching algorithm, wherein a feature point block is defined as a block surrounding the selected feature point; and the search region is defined as a region within a predetermined area which encompasses the corresponding feature point.

Even though it is possible to greatly reduce the amount of data to be transmitted through the use of the aforementioned feature point based motion estimation technique, a great deal of feature points is still selected from not only the moving objects but also stationary objects having no motion in case of using the grid or/and edge technique. The large number of feature points may require a rather complex circuitry to support the above encoding method, or still impose a high level of computational burden on the circuitry for detecting the motion vectors therefor. Furthermore, it may be required to further reduce the volume of data to be transmitted in order to successfully implement a low-bit rate codec system having, e.g., 64 kb/s transmission channel bandwidth.

SUMMARY OF THE INVENTION

It is, therefore, an object of the present invention is to provide an apparatus and method, for use in an image signal encoding apparatus, for effectively coding a bidirectionally predictive frame of the digital video signal employing a feature point based motion estimation, thereby effectively reducing the transmission rate of the digital video signal with a good picture quality.

In accordance with one aspect of the present invention, there is provided a method, for use in an image signal encoding system, for encoding a bidirectionally predictive frame (B frame) of a digital video signal based on two reconstructed neighboring frames of the B frame by employing a feature point based motion estimation approach to generate an encoded B frame signal, which comprises the steps of: (a) assigning a first reconstructed neighboring frame as a reference frame; (b) detecting a processing region representing a motion of a moving object of the digital video signal based on a difference between the reconstructed neighboring frames to generate region information denoting the detected processing region; (c) selecting a number of pixels from pixels contained in the detected processing region of the reference frame as a set of feature points based on the region information; (d) determining a set of motion vectors between the current and the reference frames, each of the set of motion vectors representing a motion for each of the feature points; (e) assigning the set of motion vectors as a first set of motion vectors and assigning a second reconstructed neighboring frames as the reference frame; (f) repeating the steps (c) and (d) to assign the set of motion vectors obtained from the repeated step (d) as a second set of motion vectors; and (g) selecting the set of motion vectors for the set of feature points from the first and the second sets of motion vectors to thereby generate the selected set of motion vector and selection information representing the selected set as the encoded B frame.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
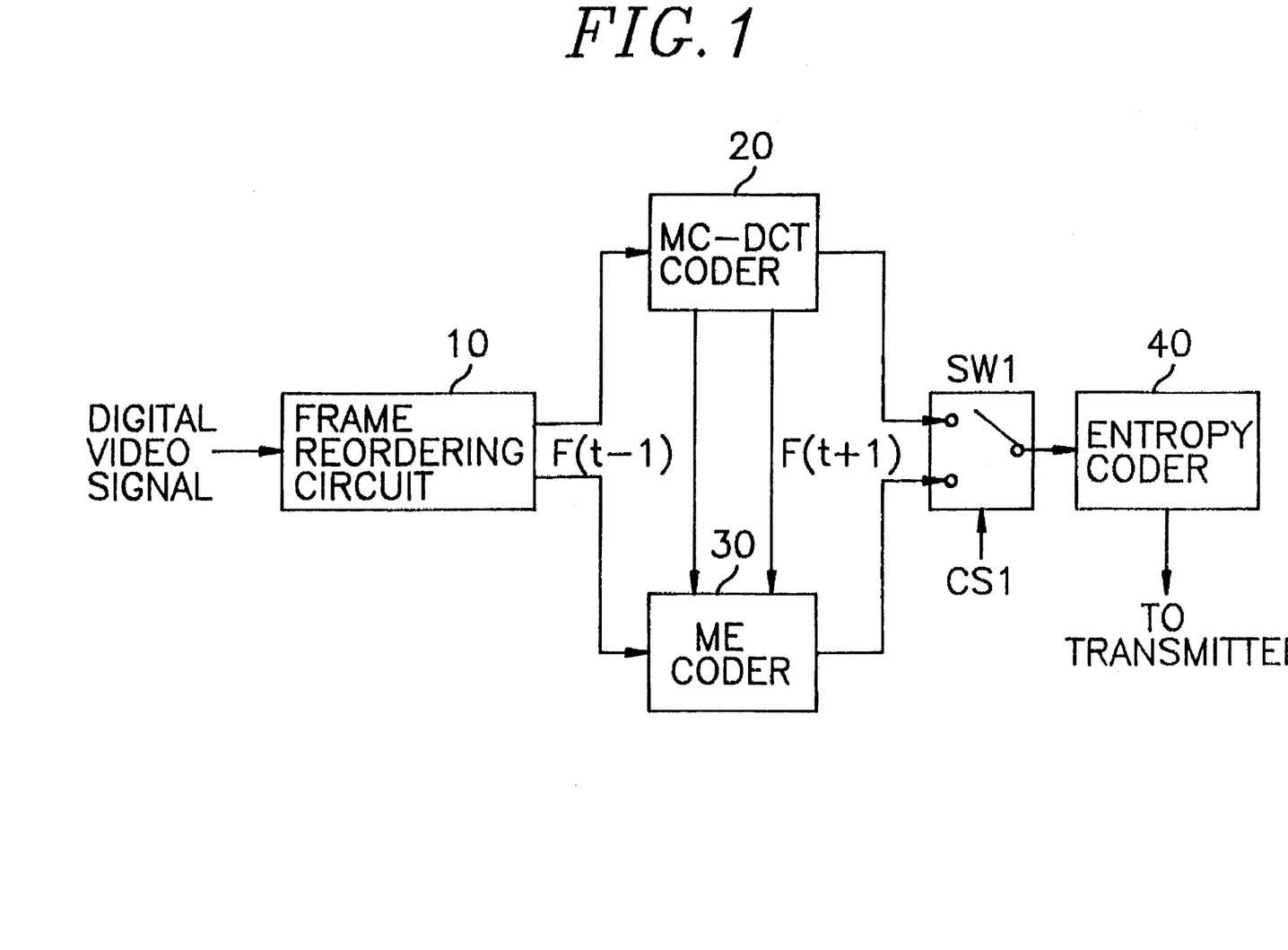
FIG. 1 is an image signal encoding apparatus having a feature point based motion estimation (ME) coder in accordance with the present invention.

Referring to FIG. 1, there is shown a block diagram of an image signal encoding apparatus in accordance with the present invention. The image encoding system comprises a frame reordering circuit 10, a motion compensation-discrete cosine transform (MC-DCT) coder 20, a motion estimation (ME) coder 30, an entropy coder 40.

Figure 2:
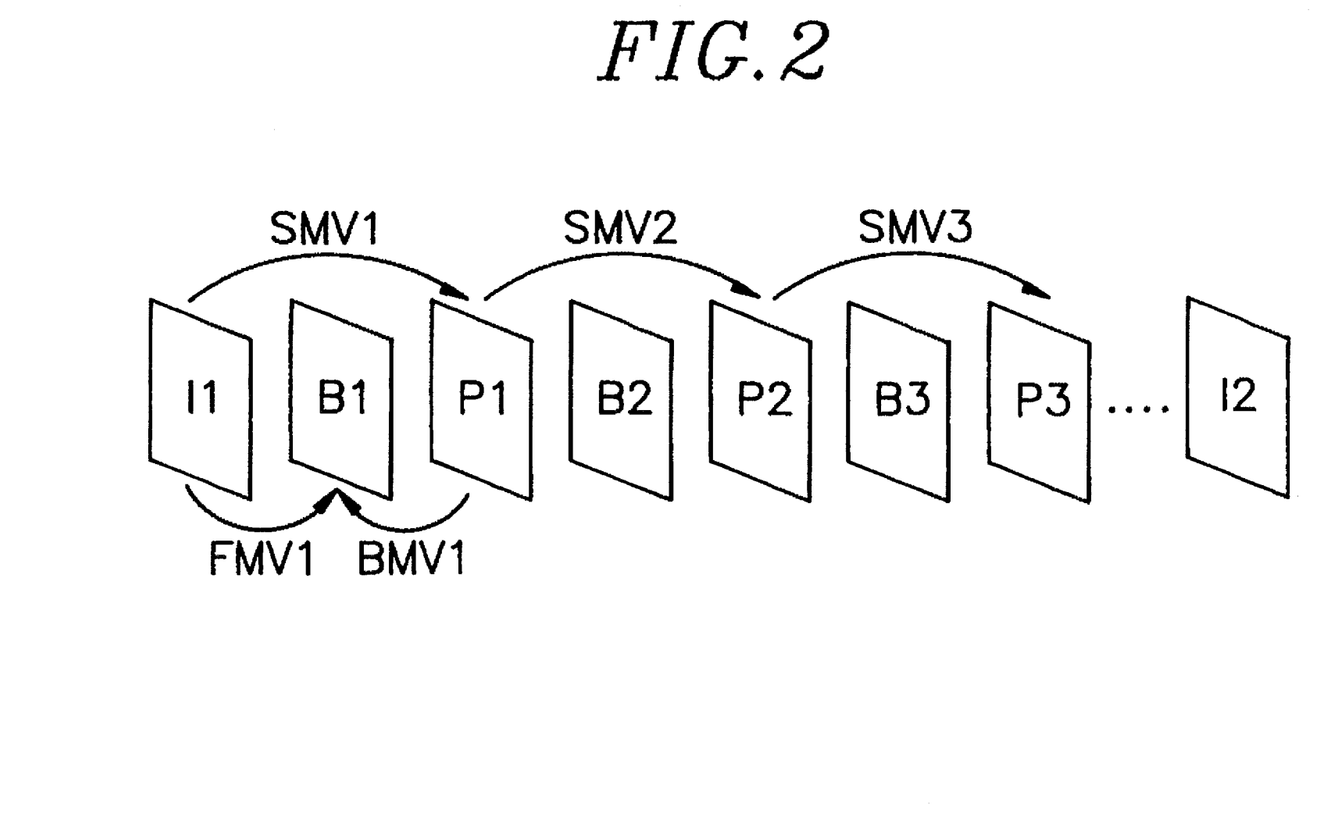
FIG. 2 depicts schematic diagrams illustrating an input frame sequence.

An input digital video signal includes an input frame (or picture) sequence which is, as shown in FIG. 2, provided with one intra(I) frame, I1, N number of bidirectionally predictive (B) frames, B1, B2, B3, . . . , BN and N-1 number of predictive (P) frames, P1, P2, P3, . . . , P N-1, N being a positive integer greater than 1. Therefore, the input frame sequence applied to the frame reordering circuit 10 includes, e.g., I1, B1, P1, B2, P2, B3, P3, . . . . At the frame reordering circuit 10, the input frame sequence is reordered into a reordered frame sequence of, e.g., I1, P1, B1, P2, B2, P3, B3 . . . in order to encode the B frames. The reordered frame sequence is then provided to the MC-DCT coder 20 and the ME coder 30. That is, the I and the P frame signals are fed to the MC-DCT coder 20, and the B frame signal is relayed to the ME coder 30.

The MC-DCT coder 20 serves to sequentially encode the I and the P frame signals, respectively, by two coding modes, e.g., an intra coding mode and an inter coding mode, in order to generate an intra coded I and an inter coded P frame signals which are then coupled via a switch SW1 to the entropy coder 40. The MC-DCT coder 20 also generates a reconstructed I and a reconstructed P frame signals which are coupled to the ME coder 30.

Thereafter, the B frame signal is relayed to the ME coder 30 which serves to encode it by using the reconstructed I and the reconstructed P frame signals to thereby generate a motion estimation coded B frame signal. The motion estimation coded B frame signal is then coupled via the switch SW1 to the entropy coder 40, wherein the switch SW1 is actuated by a control signal CS1 from a system controller (not shown).

At the entropy coder 40, the intra coded I frame signal, the inter coded P frame signal and the motion estimation coded B frame signal are coded by using, e.g., a known variable length coding technique, respectively; and transmitted as an encoded video signal to a transmitter (not shown) for the transmission thereof.

Referring to FIG. 2, there is provided an exemplary diagram showing the input frame sequence described above. As shown, when current frame is a P frame P1, at MC-DCT coder 20, a set of motion vectors SMV1 is obtained on the block-by-block basis by using the reconstructed I frame I1 as a reference frame. In a similar manner, sets of motion vectors SMV2 and SMV3 for current frames P2 and P3 are obtained by using reference frames P1 and P2, respectively.

When the current frame is the B frame B1, at the ME coder 30, a set of forward motion vectors FMV1 is obtained by using a reconstructed I frame I1 outputted from the MC-DCT coder 20, as a first reference frame, based on the improved feature point based motion estimation. In a similar manner, a set of backward motion vectors BMV1 for the current frame B1 is obtained by using the reconstructed P frame P1 from the MC-DCT coder 20 as a second reference frame. Thereafter, the ME coder 30 generates a set of motion vector for the current frame B1 as the motion estimation coded B frame by using the set of forward motion vectors FMV1 and the set of backward motion vector BMV1.

Therefore, in accordance with the preferred embodiment of the present invention, the P frames, P1, P2, P3, . . . are coded by using the DCT based predictive coding method employing the block based motion estimation; and the intervening frames, i.e., the B frames B1, B2, B3, . . . are coded by using a feature point based motion estimation coding method.

Figure 3:
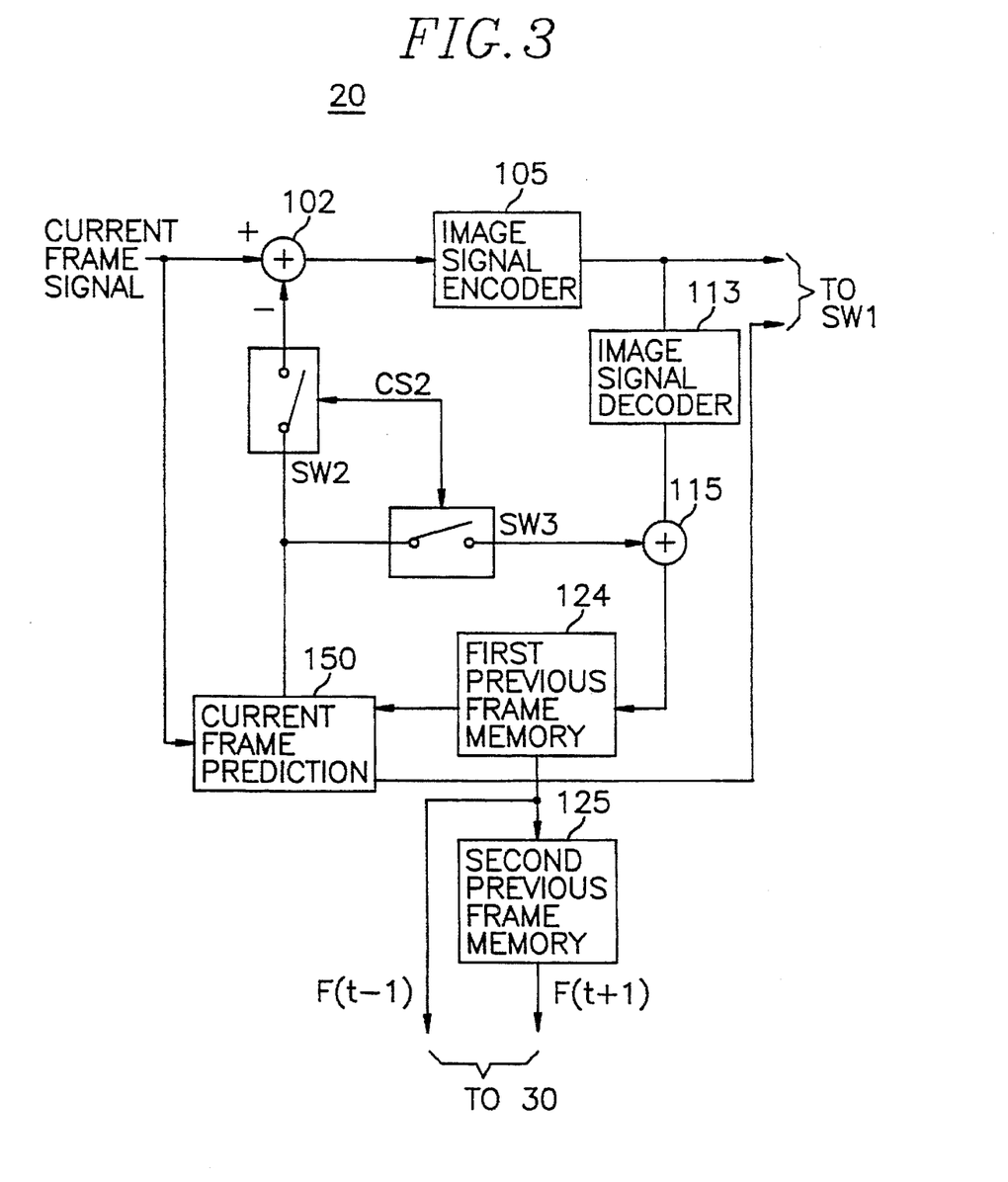
FIG. 3 shows a detailed block diagram of the motion compensation-discrete cosine transform (MC-DCT) coder shown in FIG. 1.

Referring to FIG. 3, there is illustrated the MC-DCT coder shown in FIG. 1. The MC-DCT coder 20 includes an image signal encoder 105, an image signal decoder 113, a current frame prediction circuit 150 and two previous frame memories, i.e., a first previous frame memory 124 and a second previous frame memory 125.

The MC-DCT coder 20 also includes a switch SW2 and a switch SW3 which are used for selectively performing two frame coding modes: the intra coding mode and an inter coding mode. The switches SW2 and SW3, as well known in the art, are simultaneously actuated by a coding mode control signal CS2 from the system controller.

In the intra coding mode, the I frame I1 is directly coupled as a current frame signal to the image signal encoder 105, wherein the current frame signal is encoded into a set of quantized transform coefficients, e.g., by using a discrete cosine transform (DCT) and any of the known quantization methods. Thereafter, the quantized transform coefficients are transmitted, as the intra encoded I frame signal, to an entropy coder 40 shown in FIG. 1 and an image signal decoder 113. At the entropy coder 40, the quantized transform coefficients from the image signal encoder 105 are coded together by using, e.g., a variable length coding technique; and transmitted the encoded video signal to a transmitter (not shown) for the transmission thereof.

On the other hand, the image signal decoder 113 converts the quantized transform coefficients from the image signal decoder 105 back to a reconstructed I frame signal by employing an inverse quantization and an inverse discrete cosine transform. The reconstructed I frame signal from the image signal decoder 113 is then stored in the first previous frame memory 124.

In the inter coding mode, the P frame P1 is applied as a current frame signal to the subtractor 102 and the current frame prediction circuit 150.

At the current frame prediction circuit 150, the current frame signal and a reconstructed I frame signal (the reference signal) from the frame memory 124 are processed through the use of a conventional block based motion compensation technique to predict the current frame; and the predicted current frame signal and a set of motion vectors are generated.

The predicted current frame signal is subtracted from a current frame signal at the subtractor 102, and the resultant data, i.e., an error signal denoting the differential pixel values, is dispatched to the image signal encoder 105, wherein the error signal is encoded into a set of quantized transform coefficients, e.g., by using a DCT and any of the known quantization methods. That is, the error signal obtained by subtracting the predicted current frame from the current frame is DCT-coded.

Thereafter, the quantized transform coefficients together with the set of motion vectors are transmitted, as the inter coded P frame signal, via the switch SW3 to the entropy coder 40 and the image signal decoder 113. At the entropy coder 40, the inter coded P frame signal provided from the image signal encoder 105 and the motion vectors transmitted from the current frame prediction circuit 150 are coded together by using, e.g., a variable length coding technique; and transmitted the encoded video signal to a transmitter (not shown) for the transmission thereof.

On the other hand, the image signal decoder 113 converts the quantized transform coefficients from the image signal decoder 105 back to a reconstructed error signal by employing inverse quantization and inverse discrete cosine transform.

The reconstructed error signal from the image signal decoder 113 and the predicted current frame signal from the current frame prediction circuit 150 are combined, via the switch SW3, at the adder 115 to thereby provide a reconstructed P frame signal to be stored in the first previous frame memory 124. At a same time, the reconstructed I frame signal prestored in the first previous frame memory 124 is transferred in the second previous frame memory 125. This process is sequentially repeated as long as the image encoding operation is performed.

Figure 4:
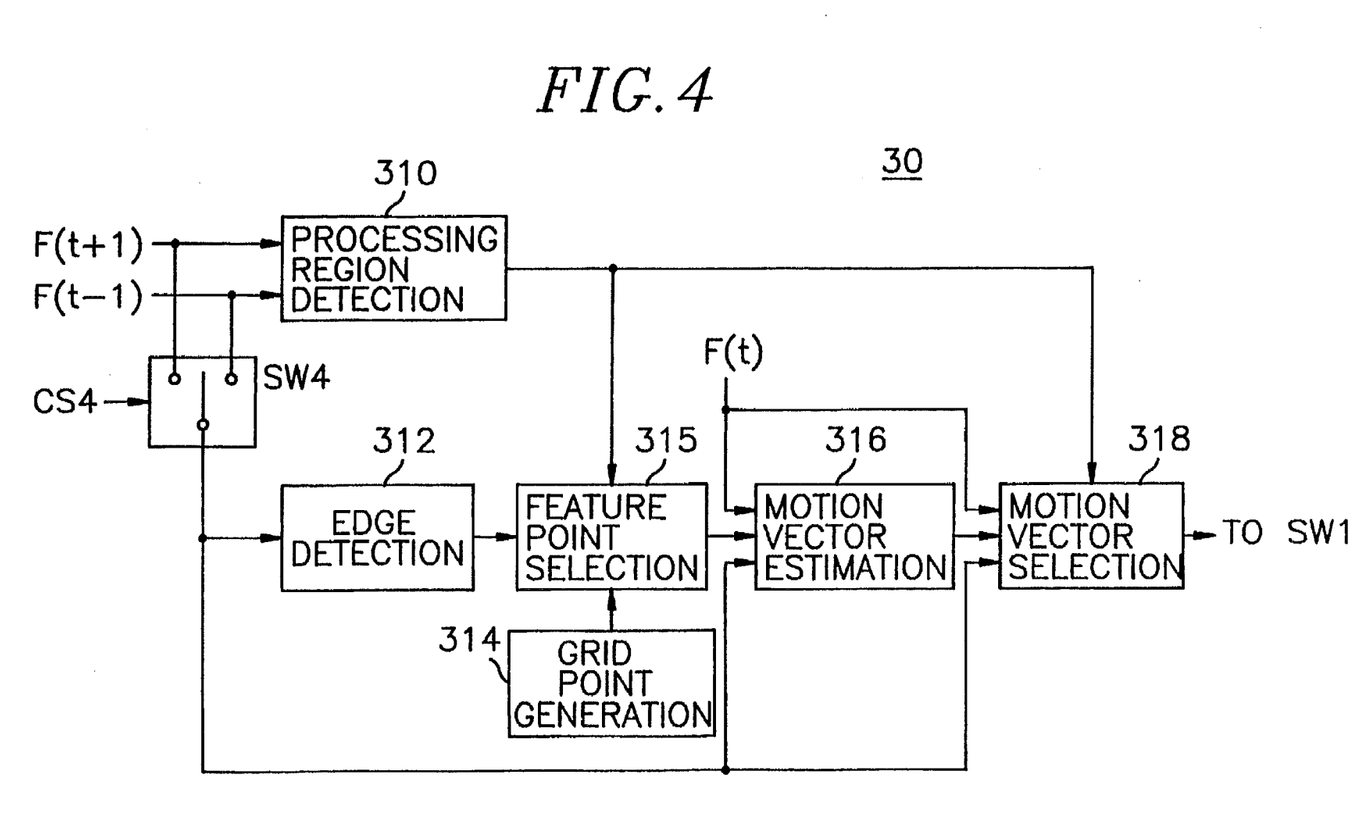
FIG. 4 exhibits a detailed block diagram of the ME encoder shown in FIG. 1.

Referring now to FIG. 4, there is illustrated a detailed block diagram of the ME coder 30 shown in FIG. 1. As shown, the ME coder 30 includes a processing region detection circuit 310, an edge detection circuit 312, a grid point generation circuit 314, a feature point selection circuit 315, a motion vector estimation circuit 316 and a motion vector determination circuit 318.

When the B frame B1 outputted from the frame reordering circuit 10 shown in FIG. 1 is applied as the current frame signal F(t) to the ME coder 30, the reconstructed I frame and the reconstructed P frame outputted from the first and the second previous frame memories 124 and 125 are dispatched, as the first and the second reference frame signals F(t+1) and F(t−1), respectively, to the processing region detection circuit 310.

At the processing region detection circuit 310, a processing region representing a motion of a moving object of the input digital video signal is detected by using a difference between two reference frame signals F(t+1) and F(t−1). That is, each of pixel values of the first reference frame signal F(t+1) is subtracted from corresponding each of pixel values of the second reference frame signal F(t−1). As a result, a frame difference signal containing a plurality of pixel difference values is obtained.

Each of the pixel difference values is then compared with a predetermined threshold value. As a result, a region of the frame difference signal is determined wherein the region represents a pixel area containing a number of pixel difference values which are greater then or equal to the predetermined threshold. The predetermined threshold can be preselected by reflecting the noise components and the camera penning vectors contained in the digital video signal. The processing region detection circuit 310 then generates processing region information representing the detected processing region which corresponds to the region of the frame difference signal. The processing region information is coupled to the feature point selection circuit 315 and the motion vector selection circuit 318.

The ME coder 30 also includes a switch SW4 which is used for sequentially performing two motion estimation modes: a forward motion estimation mode and a backward motion estimation mode. The switch SW4 is sequentially switched by a mode control signal CS4 from the system controller.

In the forward motion estimation mode, the reconstructed I frame is fed, as the first reference frame signal F(t+1), to the edge detection circuit 312, the motion vector estimation circuit 316 and the motion vector selection circuit 318.

At the edge detection circuit 312, the edge of the moving object is detected in the first reference frame signal F(t+1), by using, e.g., a known Sobel edge detector. The edge information denoting the detected edge is coupled to the feature point selection circuit 315. The grid point generation circuit 314 serves to generate a preselected grid information representing, e.g., a rectangular grid having a plurality of cross points and the preselected grid information is also coupled to the feature point selection circuit 315.

Figure 5:
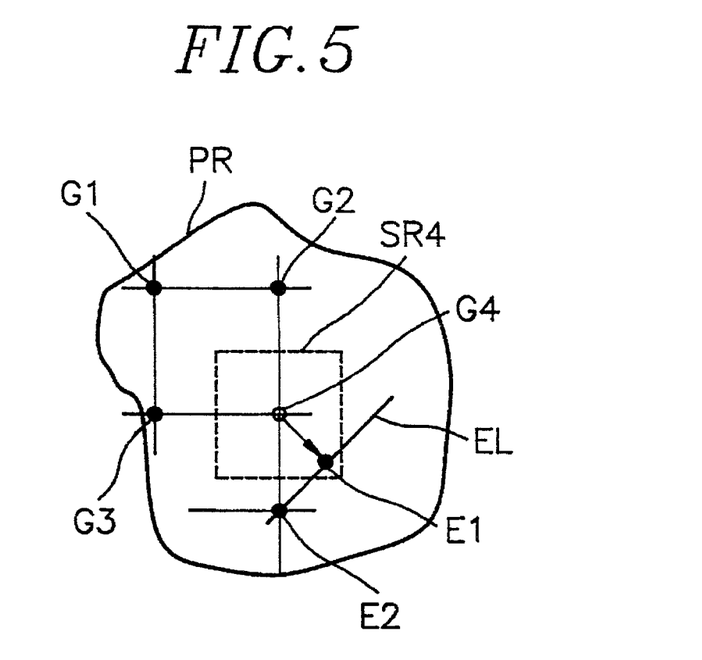
FIG. 5 offers an exemplary diagram of the feature point selecting operation in accordance with the present invention.

At the feature point selection circuit 315, a number of feature points are selected among the pixels contained in the processing region of the first reference frame signal F(t+1) through the use of the processing region information, the edge information and the predetermined grid information. That is, as shown in FIG. 5, for each of the grid points, e.g., G4, a non-overlapping searching range, e.g., SR4 is set, wherein a reference notation PR denotes, e.g., the selected processing region. An edge point, e.g., E1 located in the searching range SR4 becomes a feature point for the grid point, e.g., G4, if the value of the edge point, e.g., E1 is maximum. An intersection point E2 of the grid and the edge EL is also selected as a feature point. On the other hand, the nodes of the grid G1, G2 and G3 having no edge point contained in their searching range are not selected as feature points. Therefore, since the set of feature points is selected by using the grid and edge technique, the selected feature points are defined as the pixels which are capable of representing the motion of the object of the digital video signal.

Figure 6:
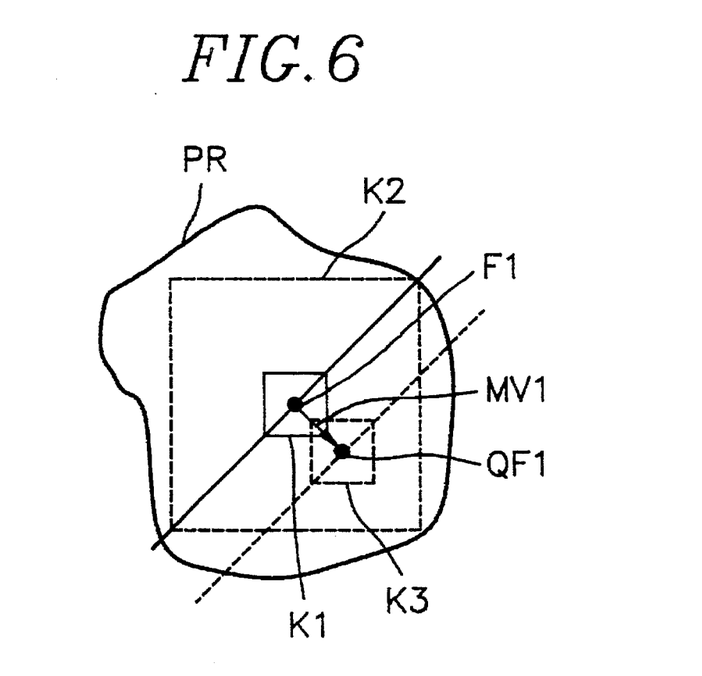
FIG. 6 demonstrates an exemplary diagram of the feature point motion estimating operation in accordance with the present invention.

At the motion vector estimation circuit 316, a first set of motion vectors for the selected feature points is detected based on the first reference frame signal F(t+1) and the current frame signal. Each of the motion vectors in the first set represents a spatial displacement between a feature point in the first reference frame and a most similar pixel thereto in the current frame. There are numerous processing algorithms available for use to detect the motion vectors on a pixel-by-pixel basis. As shown in FIG. 6, in the preferred embodiment of the invention, a block matching algorithm is used: that is, when a feature point block K1 of the first reference frame having a feature point F1 at the centre thereof is formed. Thereafter, a motion vector for the feature point block is determined after a similarity calculation by using an error function, e.g., MAE (mean absolute error) or MSE (mean square error), between the feature point block K1 and each of a plurality of equal-sized candidate blocks, e.g., K3 included in a generally larger search region K2 of P×Q, e.g., 10×10, pixels of the current frame, wherein the search region K2 is so determined to be included within the processing region PR; and a motion vector MV1 is a displacement between the feature point block F1 and a candidate block K3 which yields a minimum error function. The determined motion vector MV1 is then set as the motion vector of the feature point F1 in order to obtain the first set of motion vectors of all of the feature points which is relayed to the motion vector selection circuit 318.

In the backward motion estimation mode, the reconstructed P frame is fed, as the second reference frame signal F(t−1), via the switch SW4 to the edge detection circuit 312, the motion vector estimation circuit 316 and the motion vector selection circuit 318. A second set of motion vectors is determined by using the same manner used in the above forward motion estimation except that a set of feature points are selected from the second reference frame F(t−1); and the second set of motion vectors is obtained by using the second reference frame F(t−1) and the current frame. The second set of motion vectors is then relayed to the motion vector selection circuit 318.

At the motion vector selection circuit 318, a set of motion vectors is selected as the motion estimation coded B frame signal by using the first and the second set of motion vectors, wherein the selected set of motion vectors serves to generate a more similar predicted current frame which yields a minimum peak signal to noise ratio (PSNR). Therefore, two predicted current frames, e.g., forward and backward predicted current frames are initially determined by using the first and the second sets of motion vectors.

Figure 7:
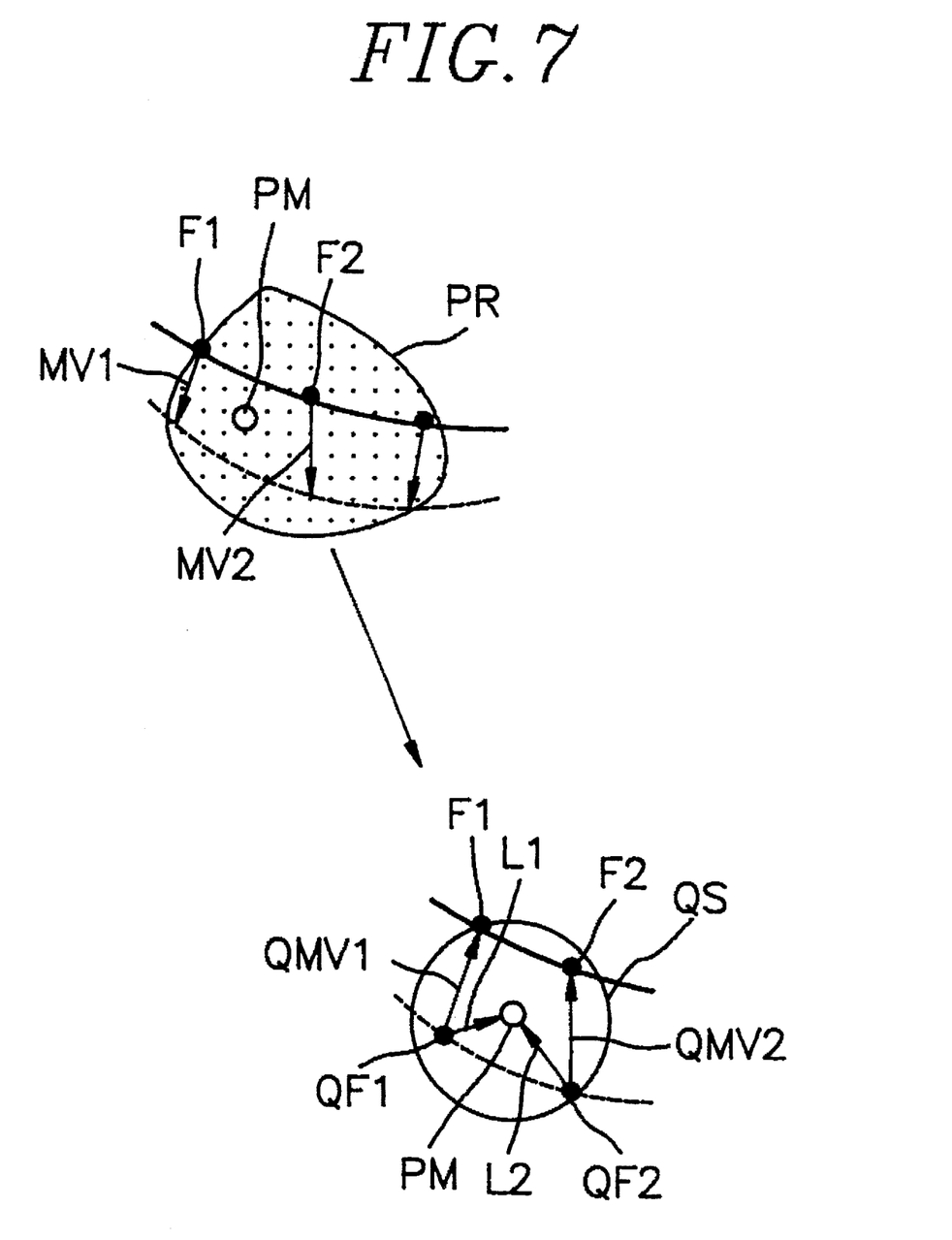
FIG. 7 illustrates an explanatory diagram describing non-quasi-feature point motion vector searching process in accordance with the present invention.

First, the forward predicted current frame is determined by using the first set of motion vectors, current frame and the first reference frame F(t+1). In order to obtain the forward prediction current frame, a first group of motion vectors for all of the pixels contained in the current frame is determined through the use of the first set of forward motion vectors and the region information. The first group of motion vectors includes two sub-groups of motion vectors, e.g., a first sub-group of motion vectors for quasi-feature points; and a second sub-group of motion vectors for non-quasi-feature points, wherein the quasi-feature points represent the pixels of the current frame shifted from the feature points contained in the processing region of the previous frame by the first set of motion vectors; and the non-quasi-feature points denote remaining pixels contained in the processing region of the current frame. The quasi-feature points are determined by using the first set of motion vectors which is then converted into the first sub-group of motion vectors for the determined quasi-feature points. The second sub-group of motion vectors for the non-quasi-feature points contained in the processing region of the current frame is then detected by using the first sub-group of motion vectors. As shown in FIG. 7, in order to obtain each of motion vectors for each of the non-quasi-feature points, e.g., PM, a motion searching range, e.g., QS is set. Motion vectors QMV1 and QMV2 for the quasi-feature points QF1 and QF2, respectively, located in the motion searching range QS are used for calculation of a motion vector for the non-quasi-feature point PM. As described above, when a number of quasi-feature points contained in the motion searching range are selected as influential quasi-feature points, the motion vector $QMV_{PM}$ for the non-quasi-feature point PM is calculated as:

$$QMV_{PM} = \frac{\sum_{i=1}^{M}\left(\frac{QMV_i}{L_i} \times w_i\right)}{\sum_{i=1}^{M}\left(\frac{1}{L_i} \times w_i\right)} \qquad \text{Eq. (1)}$$

wherein $QMV_i$ is a motion vector for an ith quasi-feature point, M is the number of quasi-feature points in the current frame, $L_i$ is the distance between the ith quasi-feature point and the non-quasi-point PM; and $w_i$ is a weight factor for the ith quasi-feature point. If the ith quasi-feature point is contained in the motion search range QS as an influential quasi-feature point, the weight factor is 1; and otherwise, 0. In the same manner, the second sub-group of all of the non-quasi-feature points is determined.

The first sub-group of motion vectors for the quasi-feature points and the second sub-group of motion vectors for the non-quasi-feature points are set to the first group of motion vectors for all of the pixels contained in the current frame wherein the motion vectors for the pixels lying outside the processing region in the current frame are set to zeros.

The first group of motion vectors for all of the pixels in the current frame is then used in the prediction of forward predicted current frame. That is, each value of the pixels to be contained in a predicted current frame is extracted from the first reference frame by using each of the motion vectors contained in the first group, thereby providing the forward predicted current frame signal.

In the same manner, the backward predicted current frame is then determined by using a second group of motion vectors derived from the second set of motion vectors based on the second reference frame and the current frame.

Thereafter, one set of motion vectors for the feature points is selected from the first and the second sets of motion vectors based on the forward and backward predicted frames. That is, the selected set of motion vectors serves to generate a more similar predicted current frame which yields a minimum PSNR. And then the selected set of motion vectors and a selection information representing thereof outputted from the motion vector selection circuit 318 are relayed, as the motion estimation coded B frame signal, via the switch SW1 to the entropy coder 40.

Figure 8:
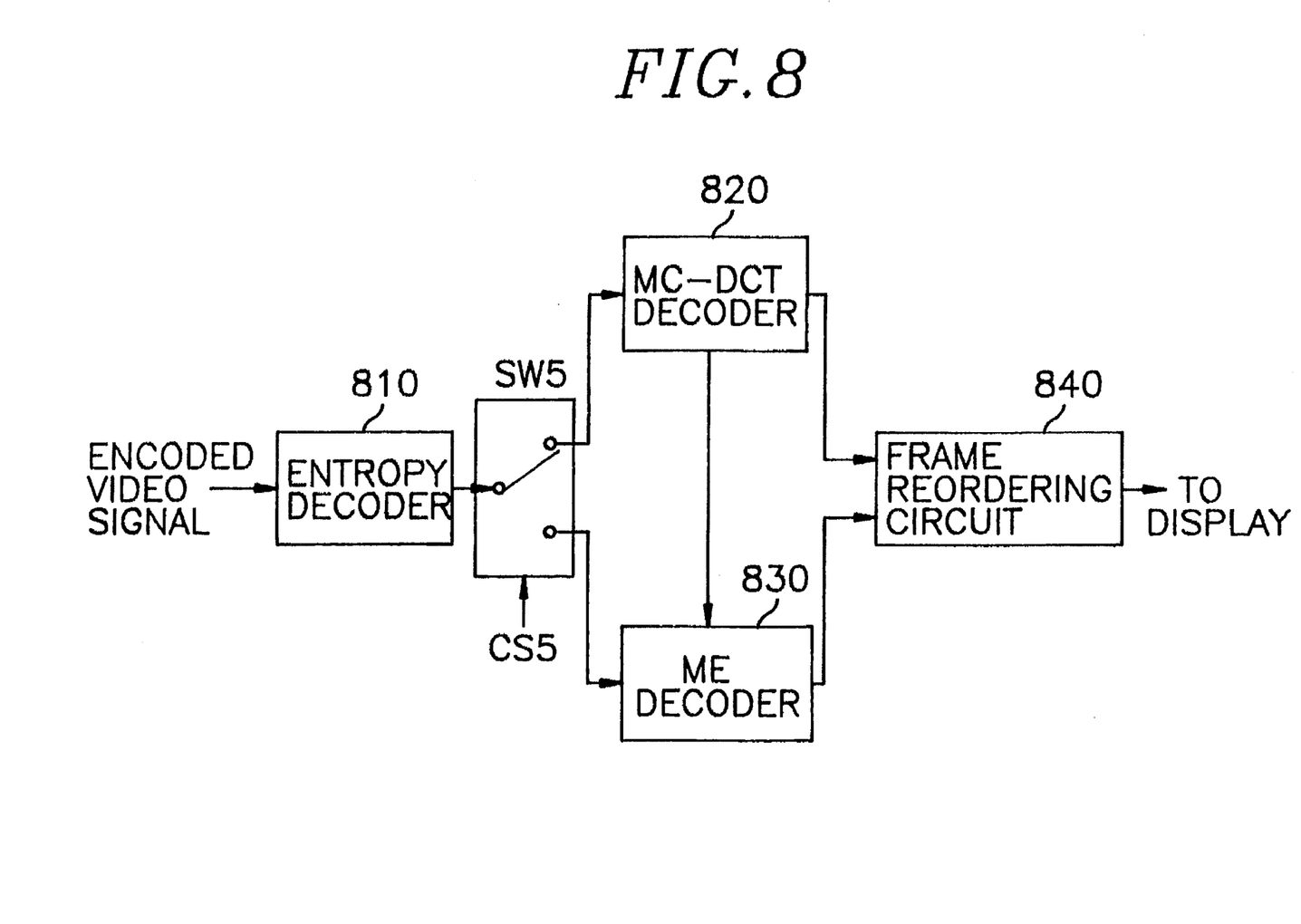
FIG. 8 is an image signal decoding apparatus having a feature point based ME decoder in accordance with the present invention.

Referring to FIG. 8, there is provided an image signal decoding apparatus corresponding to the image signal encoding apparatus shown in FIG. 1 in accordance with the present invention. The decoding system serves to decode the coded video signal comprising the intra coded I and the inter coded P frame signals and the motion estimation coded B frame signal; and includes an entropy decoder 810, an MC-DCT decoder 820, an ME decoder 830 and a frame reordering circuit 840.

The coded video signal having the intra coded I and the inter coded P frame signals and the motion estimation coded B frame signal is coupled via the transmission channel to the image signal decoding apparatus. The intra coded I frame signal and the inter coded P frame signal are fed, via the entropy decoder 810 and the switch SW5, to the MC-DCT decoder 820 which converts them to a reconstructed I frame signal and a reconstructed P frame signals, respectively. The reconstructed I and P frame signals are then relayed to the frame reordering circuit 840.

On the other hand, the motion estimation coded B frame signal is dispatched, via the entropy decoder 810 and the switch SW5, to the ME decoder 830 which converts it to a reconstructed B frame signal. The reconstructed B frame is then relayed to the frame reordering circuit 840.

At the frame reordering circuit 840, a reconstructed frame (or picture) sequence, e.g., reconstructed frames I1, P1, B1, P2, B2, P3, B3, . . . , outputted from the MC-DCT decoder 820 and ME decoder 830 is converted into a reordered reconstructed frame sequence which includes I1, B1, P1, B2, P2, B3, P3, . . . . The reordered reconstructed frame sequence is then applied to the display screen (not shown) in order to display thereon.

Figure 9:
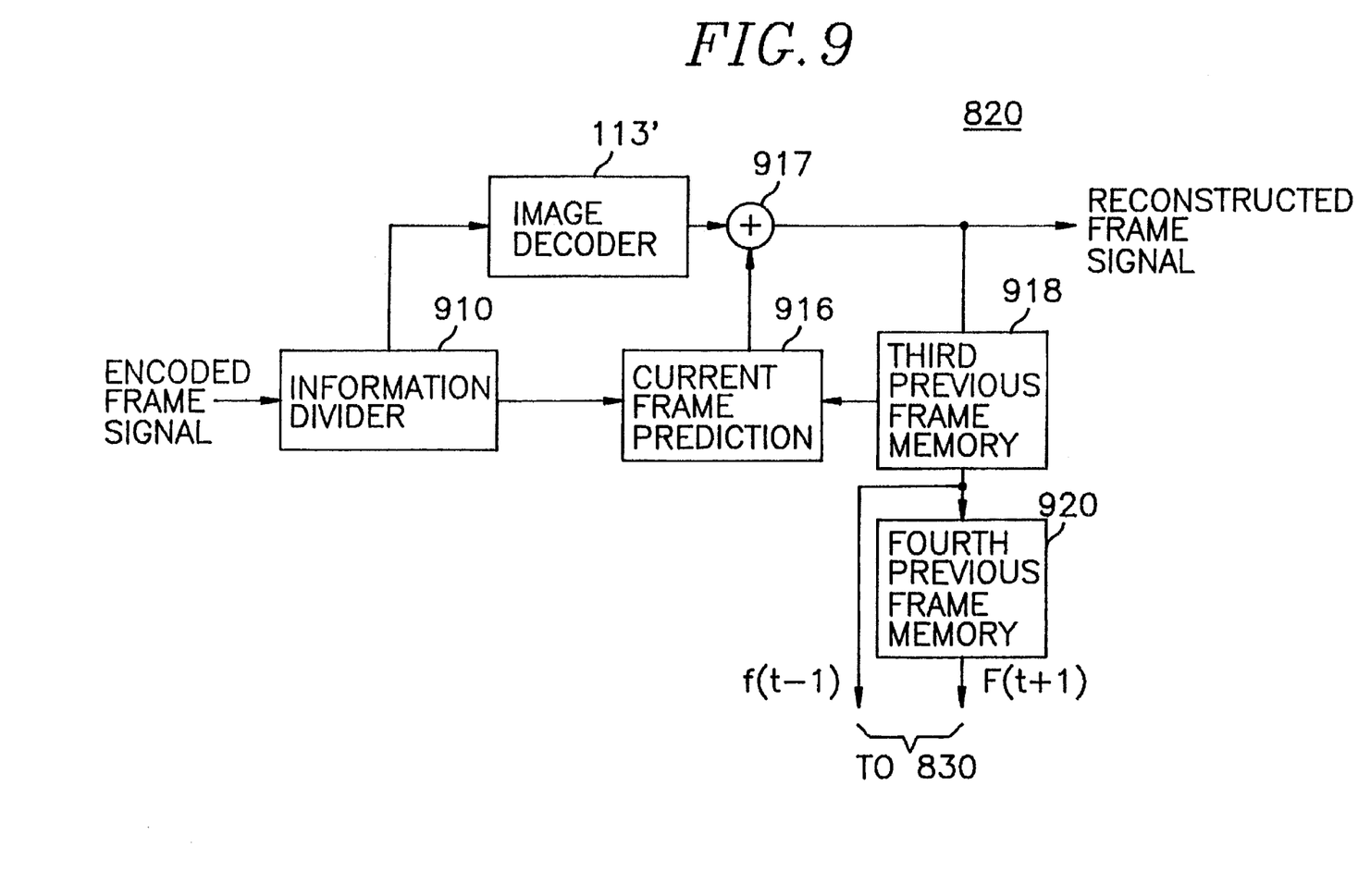
FIG. 9 shows a detailed block diagram of the MC-DCT decoder shown in FIG. 8.

Referring to FIG. 9, there is illustrated a MC-DCT decoder 820 shown in FIG. 8. For the sake of convenience, like parts appearing in FIGS. 3 and 9 are represented by like reference numerals. When the intra coded I frame signal is fed via an information divider 910 to an image decoder 113', in the similar manner used in the encoder system, the image signal decoder 113' converts the quantized transform coefficients of intra coded I frame signal back to a reconstructed I frame signal by employing an inverse quantization and an inverse discrete cosine transform. The reconstructed I frame signal from the image signal decoder 113' is then stored in a third previous frame memory 918.

When the inter coded P frame signal is relayed to the information divider 910, the information divider 910 divides the inter coded P frame signal into quantized transform coefficients and a set of motion vectors which is coupled to the image decoder 113' and a current frame prediction circuit 916, respectively. At the current frame prediction circuit 916, the current frame is predicted by using the set of motion vectors. On the other hand, at the image decoder 113', the quantized transform coefficients are converted back to a reconstructed error signal by employing inverse quantization and inverse discrete cosine transform.

Thereafter, the reconstructed error signal and the predicted current frame signal are combined in an adder 917 to thereby provide a reconstructed P frame signal to be stored in the third previous frame memory 918. At the same time, the reconstructed I frame signal prestored in the third previous frame memory 918 is transferred in a forth previous frame memory 920. This process is sequentially repeated as long as the image decoding operation is performed.

Figure 10:
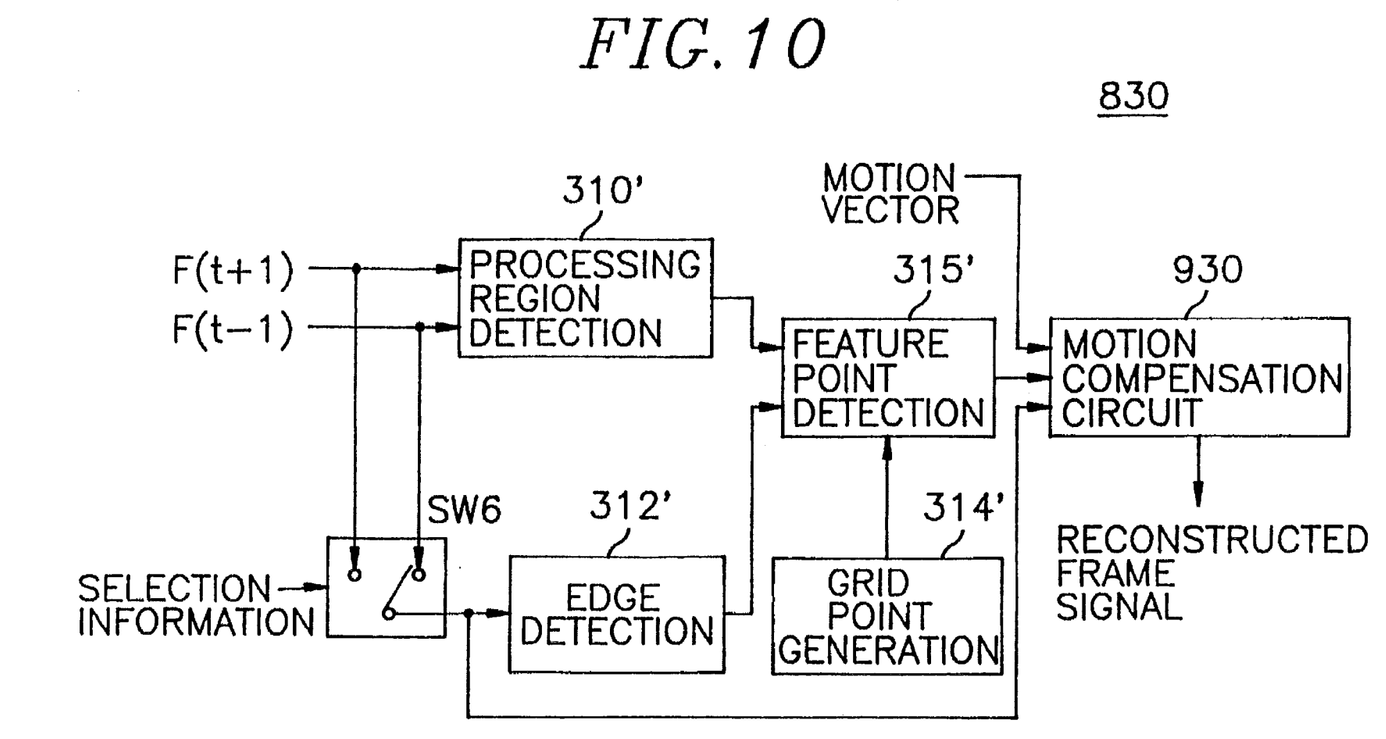
FIG. 10 exhibits a detailed block diagram of the ME decoder shown in FIG. 9.

Referring now to FIG. 10, there is illustrated an ME decoder 830 shown in FIG. 8. In the same manner employed in FIG. 9, like parts appearing in FIGS. 4 and 10 are represented by like reference numerals. When the motion estimation coded B frame is relayed to the ME decoder 830, the reconstructed I frame and the reconstructed P frame outputted from the third and the fourth previous frame memories 918 and 920 are coupled, as the first and the second reference frame signals F(t+1) and F(t−1), to the processing region detection circuit 310'. At the processing region detection circuit 310', in the same manner used in the ME encoder, a processing region representing the motion of the moving object is detected by using the difference between two reference frame signals F(t+1) and F(t−1).

On the other hand, the reference frame signal is selected by a switch SW6 actuated by the selection information of the motion estimation coded B frame. The selected reference frame signal is fed to the edge detection circuit 312' and a motion compensation circuit 930. And then, in the same manner used in the ME coder, a set of feature points is selected by using the edge detection circuit 312', the grid point generation circuit 314' and the feature point selection circuit 315' based on the processing region information and the selected reference frame.

The motion compensation circuit 930 receives the set of motion vectors of the motion estimation coded B frame signal and generates a reconstructed B frame signal through the use of the above current frame prediction process used in the motion vector selection circuit 318 shown in FIG. 4.

As may be seen from the above, it is readily appreciated that, since the inventive image signal encoding apparatus employs a feature point based motion estimation coding method for coding the bidirectionally predictive frame, it is possible to greatly reduce the amount of data to be transmitted without degrading the picture quality. Furthermore, in the inventive feature point based motion estimation coding method, a limited number of feature points selected from the processing region is used for the motion estimation to thereby further reduce the computational burden and amount of motion vectors to be transmitted, thereby further improving the coding efficiency.

While the present invention has been shown and described with reference to the particular embodiments, it will be apparent to those skilled in the art that many changes and modifications may be made without departing from the spirit and scope of the invention as defined in the appended claims.

What is claimed is:

1. A method, for use in an image signal encoding system, for encoding a bidirectionally predictive frame (B frame) of a digital video signal based on two reconstructed neighboring frames of the B frame by employing a feature point based motion estimation approach to generate an encoded B frame signal, which comprises the steps of:

(a) assigning a first reconstructed neighboring frame as a reference frame;

(b) detecting a processing region representing a motion of a moving object of the digital video signal based on a difference between the reconstructed neighboring frames to generate region information denoting the detected processing region;

(c) selecting a number of pixels from pixels contained in the detected processing region of the reference frame as a set of feature points based on the region information;

(d) determining a set of motion vectors between the current and the reference frames, each of the set of motion vectors representing a motion for each of the feature points;

(e) assigning the set of motion vectors as a first set of motion vectors and assigning a second reconstructed neighboring frame as the reference frame;

(f) repeating the steps (c) and (d) to assign the set of motion vectors obtained from the repeated step (d) as a second set of motion vectors; and (g) selecting the set of motion vectors for the set of feature points from the first and the second sets of motion vectors to thereby generate a selected set of motion vectors and selection information representing the selected set as the encoded B frame.

2. The method as recited in claim 1, wherein said step (b) includes the steps of:

(b1) subtracting each pixel value of the first reconstructed neighboring frame from each corresponding pixel value of the second reconstructed neighboring frame to generate a frame difference signal containing a plurality of pixel difference values; and (b2) comparing each of the pixel difference values with a predetermined threshold value to generate processing region information, wherein the processing region information represents the detected processing region which corresponds to a region of the frame difference signal containing a number of the pixel difference values, each being greater than or equal to the predetermined threshold.

3. The method as recited in claim 2, wherein said step(g) includes the steps of:

(g1) determining a first group of motion vectors for all pixels contained in the processing region of the B frame based on the first set of motion vectors;

(g2) determining a second group of motion vectors for all pixels contained in the processing region of the B frame based on the second set of motion vectors;

(g3) producing a first predicted B frame and a second predicted B frame by using the first and the second groups of motion vectors, respectively; and (g4) selecting the set of motion vectors for the set of feature points from the first and the second sets of motion vectors, wherein the selected set of motion vectors generates a more similar predicted B frame to the B frame.

4. The method as recited in claim 3, wherein said step (g1) includes the steps of:

(g11) converting the first set of motion vectors to a first sub-group of motion vectors for quasi-feature point pixels contained in the B frame wherein the quasi-feature point pixels represent a number of pixels of the B frame shifted from the feature point pixels of the first reference frame by the first set of motion vectors; and (g12) extracting a second sub-group of motion vectors for remaining pixels contained in the processing region of the B frame by using the first sub-group of motion vectors to thereby produce the first group of motion vectors including the first and the second sub-groups of motion vectors.

5. The method as recited in claim 4, wherein said steps (g2) includes the steps of:

(g21) converting the second set of motion vectors to a first sub-group of motion vectors for quasi-feature point pixels contained in the B frame wherein the quasi-feature point pixels represent a number of pixels of the B frame shifted from the feature point pixels of the second reference frame by the second set of motion vectors; and (g22) extracting a second sub-group of motion vectors for remaining pixels contained in the processing region of the B frame by using the first sub-group of motion vectors to thereby produce the second group of motion vectors including the first and the second sub-groups of motion vectors.

6. The method as recited in claim 5, wherein said steps (g12) and (g22) include the steps of:

(g221) assigning each of the remaining pixels of the current frame as a target pixel;

(g222) selecting one or more quasi-feature point pixels contained in a predetermined region encompassing the target pixel; and (g223) calculating a motion vector for the target pixel by using motion vectors for the selected quasi-feature point pixels to thereby generate the second sub-group of motion vectors for all of the remaining pixels.

7. The method as recited in claim 6, wherein said step (c) includes the step of selecting the set of feature point pixels from the reference frame by using a grid and edge detection method which selects pixels located on the edge as the feature point pixels, wherein each of the selected pixels is located in a predetermined search range encompassing a corresponding node of the grid and has a maximum value among values of pixels contained the predetermined search range.

8. The method as recited in claim 7, wherein the grid is a rectangular grid.

9. An apparatus, for use in an image signal encoding system, for encoding a bidirectionally predictive frame (B frame) of a digital video signal based on two reconstructed neighboring frames of the B frame by employing a feature point based motion estimation approach to generate an encoded B frame signal, which comprises the steps of:

means for providing a first reconstructed neighboring frame as a first reference frame and providing a second reconstructed neighboring frame as a second reference frame;

a detection means for detecting a processing region representing a motion of a moving object of the digital video signal based on a difference between the first and second reconstructed neighboring frames to generate region information denoting the detected processing region;

a first selection means for selecting two groups of pixels from pixels contained in the detected processing regions of the first and the second reference frames as a first and a second sets of feature points based on the region information, respectively;

a motion estimation means for determining a first set of motion vectors between the current and the first reference frames and determining a second set of motion vectors between the current and the second reference frames, each of the of motion vectors representing a motion for each of the feature points;

a second selection means for selecting the set of motion vectors for the set of feature points from the first and the second sets of motion vectors to thereby generate a selected set of motion vectors and selection information representing the selected set as the encoded B frame.

10. The apparatus as recited in claim 9, wherein said detection means includes:

means for subtracting each pixel value of the first reconstructed neighboring frame from each corresponding pixel value of the second reconstructed neighboring frame to generate a frame difference signal containing a plurality of pixel difference values; and means for comparing each of the pixel difference values with a predetermined threshold value to generate processing region information, wherein the processing region information represents the detected processing region which corresponds to a region of the frame difference signal containing a number of the pixel difference values, each being greater than or equal to the predetermined threshold.

11. The apparatus as recited in claim 10, wherein said second selection means includes:

first determination means for determining a first group of motion vectors for all pixels contained in the processing region of the B frame based on the first set of motion vectors;

second determination means for determining a second group of motion vectors for all pixels contained in the processing region of the B frame based on the second set of motion vectors;

means for producing a first predicted B frame and a second predicted B frame by using the first and the second groups of motion vectors, respectively; and means for selecting the set of motion vectors for the set of feature points from the first and the second sets of motion vectors, wherein the selected set of motion vectors generates a more similar predicted B frame to the B frame.

12. The apparatus as recited in claim 11, wherein said first determination means includes:

means for converting the first set of motion vectors to a first sub-group of motion vectors for quasi-feature point pixels contained in the B frame wherein the quasi-feature point pixels represent a number of pixels of the B frame shifted from the feature point pixels of the first reference frame by the first set of motion vectors; and means for extracting a second sub-group of motion vectors for remaining pixels contained in the processing region of the B frame by using the first sub-group of motion vectors to thereby produce the first group of motion vectors including the first and the second sub-groups of motion vectors.

13. The apparatus as recited in claim 12, wherein said second determination means includes:

means for converting the second set of motion vectors to a first sub-group of motion vectors for quasi-feature point pixels contained in the B frame wherein the quasi-feature point pixels represent a number of pixels of the B frame shifted from the feature point pixels of the second reference frame by the second set of motion vectors; and means for extracting a second sub-group of motion vectors for remaining pixels contained in the processing region of the B frame by using the first sub-group of motion vectors to produce the first and the second sub-groups of motion vectors as the second group of motion vectors.

14. The apparatus as recited in claim 13, wherein said extraction means includes:

means for assigning each of the remaining pixels of the current frame as a target pixel;

means for selecting one or more quasi-feature point pixels contained in a predetermined region encompassing the target pixel; and means for calculating a motion vector for the target pixel by using motion vectors for the selected quasi-feature point pixels to thereby generate the second sub-group of motion vectors for all of the remaining pixels.

15. The apparatus as recited in claim 14, wherein said first selection means includes means for selecting the set of feature point pixels from the reference frame by using a grid and edge detection method which selects pixels located on the edge as the feature point pixels, wherein each of the selected pixels is located in a predetermined search range encompassing a corresponding node of the grid and has a maximum value among values of pixels contained the predetermined search range.

16. The apparatus as recited in claim 15, wherein the grid is a rectangular grid.

17. A method, for use in an image signal decoding system, for decoding an encoded bidirectionally predictive frame (encoded B frame) of an encoded digital video signal based on two reconstructed neighboring frames of the encoded B frame by employing a feature point based motion estimation approach to generate a reconstructed B frame signal, wherein the B frame includes a set of motion vectors and selection information, which comprises the steps of:

(a) selecting one of reconstructed neighboring frame as a reference frame based on the selection information;

(b) detecting a processing region representing a motion of a moving object of the digital video signal based on a difference between the reconstructed neighboring frames to generate region information denoting the detected processing region;

(c) selecting a number of pixels from pixels contained in the detected processing region of the reference frame as a set of feature points based on the region information; and (d) providing the reconstructed B frame by using the set of motion vectors, the selected set of feature points and the reference frame.

18. The method as recited in claim 17, wherein said step (b) includes the steps of:

(b1) subtracting each pixel value of a first reconstructed neighboring frame from each corresponding pixel value of a second reconstructed neighboring frame to generate a frame difference signal containing a plurality of pixel difference values; and (b2) comparing each of the pixel difference values with a predetermined threshold value to generate the processing region information, wherein the region information represents the detected processing region which corresponds to a region of the frame difference signal containing a number of the pixel difference values, each being greater than or equal to the predetermined threshold.

19. The method as recited in claim 18, wherein said step (d) includes the steps of:

(d1) determining a group of motion vectors for all pixels contained in the processing region of the B frame based on the set of motion vectors; and (d2) producing the reconstructed B frame and a second predicted B frame by using the group of motion vectors and the reference frame.

20. The method as recited in claim 19, wherein the step (c) includes the step of selecting the set of feature point pixels from the reference frame by using a grid and edge detection method which selects pixels located on the edge as the feature point pixels, wherein each of the selected pixels is located in a predetermined search range encompassing a corresponding node of the grid and has a maximum value among values of pixels contained the predetermined search range.

21. An apparatus, for use in an image signal decoding system, for decoding an encoded bidirectionally predictive frame (encoded B frame) of an encoded digital video signal based on two reconstructed neighboring frames of the encoded B frame by employing a feature point based motion estimation approach to generate a reconstructed B frame signal, wherein the B frame includes a set of motion vectors and selection information, which comprises:

a first selection means for selecting one of reconstructed neighboring frames as a reference frame based on the selection information;

a detection means for detecting a processing region representing a motion of a moving object of the digital video signal based on a difference between the reconstructed neighboring frames to generate region information denoting the detected processing region;

a second selection means for selecting a number of pixels from pixels contained in the detected processing region of the reference frame as a set of feature points based on the region information; and a generation means for providing the reconstructed B frame by using the set of motion vectors, the selected set of feature points and the reference frame.

22. The apparatus as recited in claim 21, wherein said detection means includes:

means for subtracting each pixel value of a first reconstructed neighboring frame from each corresponding pixel values of a second reconstructed neighboring frame to generate a frame difference signal containing a plurality of pixel difference values; and means for comparing each of the difference pixel values with a predetermined threshold value to generate processing region information, wherein the processing region information represents the detected processing region which corresponds to a region of the frame difference signal containing a number of the pixel difference values, each being greater than or equal to the predetermined threshold.

23. The apparatus as recited in claim 22, wherein said generation means includes:

(d1) determining a group of motion vectors for all pixels contained in the processing region of the B frame based on the set of motion vectors; and (d2) producing the reconstructed B frame and a second predicted B frame by using the group of motion vectors and the reference frame.

24. The apparatus as recited in claim 23, wherein the second selection means includes means for selecting the set of feature point pixels from the reference frame by using a grid and edge detection method which selects pixels located on the edge as the feature point pixels, wherein each of the selected pixels is located in a predetermined search range encompassing a corresponding node of the grid and has a maximum value among values of pixels contained the predetermined search range.

* * * * *